US012224493B2

(12) United States Patent

Li et al.

(10) Patent No.: US 12,224,493 B2
(45) Date of Patent: Feb. 11, 2025

(54) LOW-PROFILE HIGH-EFFICIENCY WIDE-SCANNING ANTENNA ARRAY

(71) Applicant: Samsung Electronics Co., Ltd., Suwon-si (KR)

(72) Inventors: Jiantong Li, McKinney, TX (US); Alireza Foroozesh, Los Angeles, CA (US); Navneet Sharma, Allen, TX (US); Won Suk Choi, McKinney, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 18/174,583

(22) Filed: Feb. 24, 2023

(65) Prior Publication Data

US 2024/0039166 A1 Feb. 1, 2024

Related U.S. Application Data

(60) Provisional application No. 63/393,646, filed on Jul. 29, 2022.

(51) Int. Cl.
*H01Q 1/38* (2006.01)
*H01Q 13/20* (2006.01)
(Continued)

(52) U.S. Cl.
CPC .......... *H01Q 13/206* (2013.01); *H01Q 21/08* (2013.01)

(58) Field of Classification Search
CPC .. H01Q 1/24; H01Q 1/38; H01Q 1/46; H01Q 13/20; H01Q 13/206; H01Q 21/00;
(Continued)

(56) References Cited

U.S. PATENT DOCUMENTS 4,071,846 A * 1/1978 Oltman, Jr. ............ H01Q 9/065 343/846
4,475,107 A * 10/1984 Makimoto ........... H01Q 13/206 343/846
(Continued)

FOREIGN PATENT DOCUMENTS

CN 106505310 B 3/2019
CN 111509378 A 8/2020
(Continued)

OTHER PUBLICATIONS

Sugawa et al., "Design of microstrip comb-line antenna array composed of elements with matching circuit." International Symposium on Antennas and Propagation, ISAP2009, Oct. 2009, 4 pages.
(Continued)

*Primary Examiner* — Tho G Phan

(57) ABSTRACT

An apparatus includes a substrate, first and second transmission lines on the substrate, first antenna elements coupled to a first-first transmission line, and second antenna elements coupled to a first-second transmission line. A first distance between the adjacent first-first and first-second transmission lines is different than a second distance between the first-first transmission line and a second-second transmission line, the second-second transmission line adjacent to the first-first transmission line on an opposite side from the first-second transmission line. At least two antenna elements in the first antenna elements are differently sized.

20 Claims, 18 Drawing Sheets

(51) Int. Cl.

| | |
|---|---|
| ***H01Q 21/00*** | (2006.01) |
| ***H01Q 21/06*** | (2006.01) |
| ***H01Q 21/08*** | (2006.01) |

(58) Field of Classification Search
CPC .. H01Q 21/0037; H01Q 21/06; H01Q 21/065; H01Q 21/08; H01Q 3/36
See application file for complete search history.

(56) References Cited

U.S. PATENT DOCUMENTS

| | | | | |
|---|---|---|---|---|
| 8,624,784 | B2 * | 1/2014 | Mizutani | H01Q 13/206 343/893 |
| 9,705,199 | B2 * | 7/2017 | Apostolos | H01Q 3/34 |
| 10,122,093 | B2 * | 11/2018 | Lee | H01Q 9/285 |
| 10,340,605 | B2 * | 7/2019 | Yoshitake | H01Q 21/0093 |
| 11,502,420 | B2 * | 11/2022 | Li | H01Q 21/062 |
| 2012/0112976 | A1 | 5/2012 | Hayakawa et al. | |
| 2018/0267139 | A1 | 9/2018 | Park | |
| 2018/0341005 | A1 | 11/2018 | Yoo | |
| 2019/0067832 | A1 | 2/2019 | Yoshitake | |
| 2020/0412018 | A1 | 12/2020 | Tehran et al. | |
| 2022/0059937 | A1 | 2/2022 | Kuo et al. | |

FOREIGN PATENT DOCUMENTS

| | | | |
|---|---|---|---|
| CN | 112290207 | A | 1/2021 |
| CN | 112310649 | B | 7/2021 |
| CN | 113809536 | A | 12/2021 |
| JP | H09162626 | A | 6/1997 |

OTHER PUBLICATIONS

Sakakibara et al., “Array design techniques of microstrip comb-line antennas in millimeter-wave band.” 2012 IEEE Asia-Pacific Conference on Antennas and Propagation. IEEE, Aug. 2012, 2 pages.
Abu-Surra et al., “End-to-end 6G Terahertz Wireless Platform with Adaptive Transmit and Receive Beamforming.” 2022 IEEE International Conference on Communications Workshops (ICC Workshops). IEEE, 2022, 7 pages.
Samsung white-paper, “Samsung 6G vision,” Jul. 2020, 46 pages.
International Search Report and Written Opinion issued Jun. 26, 2023 regarding International Application No. PCT/KR2023/003800, 8 pages.

* cited by examiner

622

900

LOW-PROFILE HIGH-EFFICIENCY WIDE-SCANNING ANTENNA ARRAY

CROSS-REFERENCE TO RELATED APPLICATION AND PRIORITY CLAIM

This application claims priority under 35 U.S.C. § 119(e) to U.S. Provisional Patent Application No. 63/393,646 filed on Jul. 29, 2022, which is hereby incorporated by reference in its entirety.

TECHNICAL FIELD

This disclosure relates generally to multiple-input multiple-output (MIMO) antenna array devices and processes. More specifically, this disclosure relates to a low-profile high-efficiency wide-scanning antenna array.

BACKGROUND

A growing demand for various wireless applications such as robotics, automation and medical devices, necessitates higher data rates, resulting in severe traffic issues at commonly adopted bands. Machines, especially high-resolution media and extended reality (XR) are predicted to be the dominant consumer type of future communication systems. As the terahertz (THz) bands remains largely untapped, a solution is the availability of the 0.1 THz to 10 THz band, which is capable of providing wide bandwidth to address throughput shortcomings at the commonly adopted bands.

SUMMARY

This disclosure provides a low-profile high-efficiency wide-scanning antenna array.

In a first embodiment, an apparatus includes a substrate, first transmission lines, second transmission lines, first antenna elements, and second antenna elements. The first transmission lines extend on the substrate in a first direction from a first side of the substrate. The second transmission lines are alternated with the first transmission lines. The second transmission lines extend on the substrate in a second direction, which is opposite to the first direction, from a second side of the substrate that is opposite from the first side. The first antenna elements are coupled to a first of the first transmission lines (a first-first transmission line) and extend in a third direction away from the first-first transmission line. The second antenna elements are coupled to a first of the second transmission lines (a first-second transmission line) and extend in a fourth direction away from the first-second transmission lines and toward the first-first transmission line. The fourth direction is opposite to the third direction. The first-first and first-second transmission lines are positioned adjacently on the substrate. A first distance between the adjacent first-first and first-second transmission lines is different than a second distance between the first-first transmission line and a second of the second transmission lines (a second-second transmission line), the second-second transmission line is adjacent to the first-first transmission line on an opposite side from the first-second transmission line. At least two antenna elements in the first antenna elements are differently sized.

In a second embodiment, an electronic device includes an antenna and processing circuitry. The antenna includes a substrate, first transmission lines, second transmission lines, first antenna elements, and second antenna elements. The first transmission lines extend on the substrate in a first direction from a first side of the substrate. The second transmission lines are alternated with the first transmission lines. The second transmission lines extend on the substrate in a second direction, which is opposite to the first direction, from a second side of the substrate that is opposite from the first side. The first antenna elements are coupled to a first of the first transmission lines (a first-first transmission line) and extend in a third direction away from the first-first transmission line. The second antenna elements are coupled to a first of the second transmission lines (a first-second transmission line) and extend in a fourth direction away from the first-second transmission lines and toward the first-first transmission line. The fourth direction is opposite to the third direction. The first-first and first-second transmission lines are positioned adjacently on the substrate. The processing circuitry is coupled to the first and second transmission lines and supply power to control the first and second antenna elements. A first distance between the adjacent first-first and first-second transmission lines is different than a second distance between the first-first transmission line and a second of the second transmission lines (a second-second transmission line), the second-second transmission line is adjacent to the first-first transmission line on an opposite side from the first-second transmission line. At least two antenna elements in the first antenna elements are differently sized.

In a third embodiment, a method includes coupling first transmission lines on a substrate, the first transmission lines extending in a first direction from a first side of the substrate. The method also includes coupling second transmission lines on the substrate, the second transmission lines alternated with the first transmission lines, the second transmission lines extending in a second direction, opposite from the first direction, from a second side of the substrate that is opposite from the first side. The method further includes coupling first antenna elements on the substrate, the first antenna elements coupled to a first of the first transmission lines (a first-first transmission line), the first antenna elements extending in a third direction away from the first-first transmission line. In addition, the method includes coupling second antenna elements to a first of the second transmission lines (a first-second transmission line), the second antenna elements extending in a fourth direction away from the first-second transmission line and toward the first-first transmission line, the fourth direction opposite to the third direction, the first-first transmission line and the first-second transmission line positioned adjacently on the substrate. A first distance between the adjacent first-first and first-second transmission lines is different than a second distance between the first-first transmission line and a second of the second transmission lines (a second-second transmission line), the second-second transmission line is adjacent to the first-first transmission line on an opposite side from the first-second transmission line. At least two antenna elements in the first antenna elements are differently sized.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
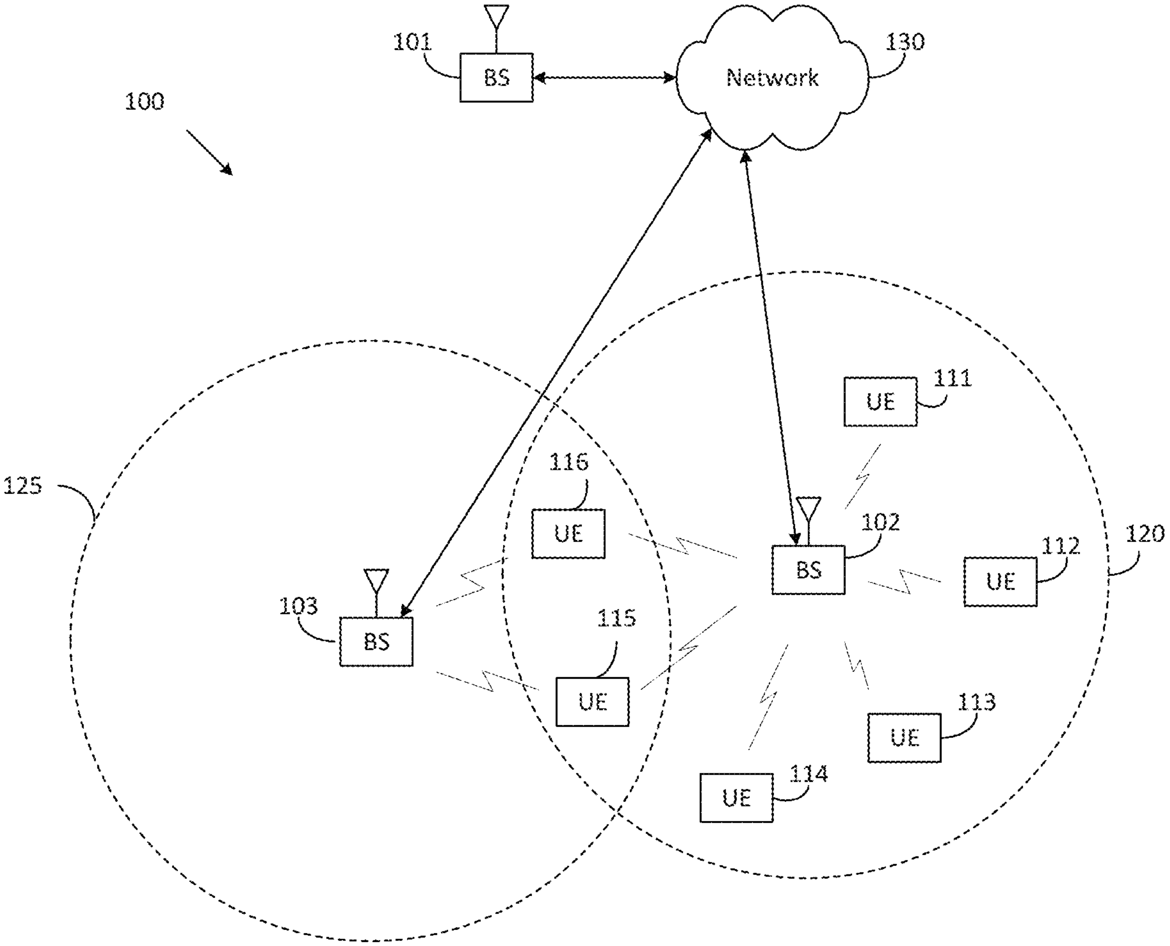
FIG. 1 illustrates an example communication system in accordance with an embodiment of this disclosure.

FIGS. 1 through 10, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

5G/NR communication systems have been developed and are currently being deployed to meet the increased demand for wireless data traffic since deployment of 4G communication systems and to enable various vertical applications. The 5G/NR communication systems are considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, development for system network improvement in 5G/NR communication systems is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

Discussions of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz).

Though the THz band meets the potential higher daterates demand for enormous wireless applications, there are several major challenges hindering the THz band use including (1) severe path loss and atmospheric absorption; (2) RF front-end components; (3) beamforming configuration; and (4) channel modeling. For THz antennas, severe path loss and small wavelength makes the design, fabrication, integration and measurement quite challenging. For instance, due to misalignment and obstruction, antenna measurement is highly influenced in terms of system throughput and reliability. Moreover, at the THz bands, low efficiency of active hardware components results in an increase of noise figure and nonlinearity issues. The multiple-input multiple-output (MIMO) technology is one option to increase channel efficiency within the same spectrum. Furthermore, a massive MIMO configuration is utilized for 5G/6G base stations to further improve the channel capacity by using a large number of antennas. With a larger antenna array configuration, a narrower beam is created, which can be spatial focused. Further, beamforming techniques are used to provide an interference-free and high-capacity link to each user, thus increasing the spatial resolution without increasing inter-cell complexity. As high efficiency, wide beam steering angle and moderate bandwidth are of critical importance for THz antenna specifications, thus there is a necessity for a low-cost low-complexity antenna solution that simultaneously achieve all aforementioned requirements.

For a THz MIMO antenna array operating with beamforming capability, there are several challenges that makes antenna design, fabrication, integration and measurement quite challenging. A first challenge is that as the frequency shifts to THz range, the wavelength decreases with more conduction, dielectric, and radiation loss. A second challenge is that 45-degree slant polarization makes element design and element-to-element transition challenging, the commonly-used, straight-line based transitions are not applicable. A third challenge is that wide beam steering performance is of critical importance to compensate severe path loss. A fourth challenge is that a THz antenna is supposed to be easily integrated with wire-bonding and flip-chip bonding techniques. A fifth challenge is that to maximize the antenna aperture, differential feeding is better supported from both sides. A sixth challenge is low cost and low complexity.

Figure 2:
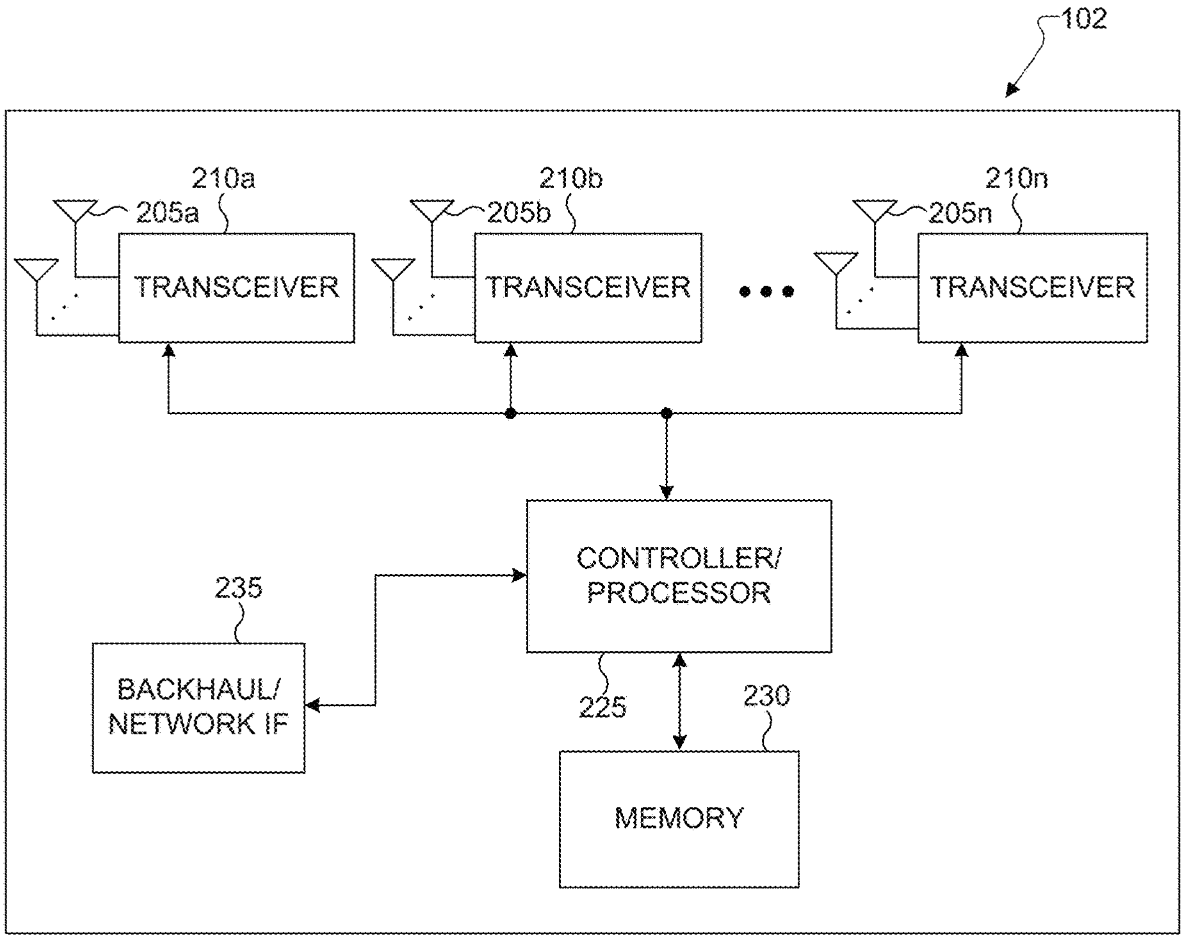
FIGS. 2 and 3 illustrate example electronic devices in accordance with an embodiment of this disclosure.
Figure 3:
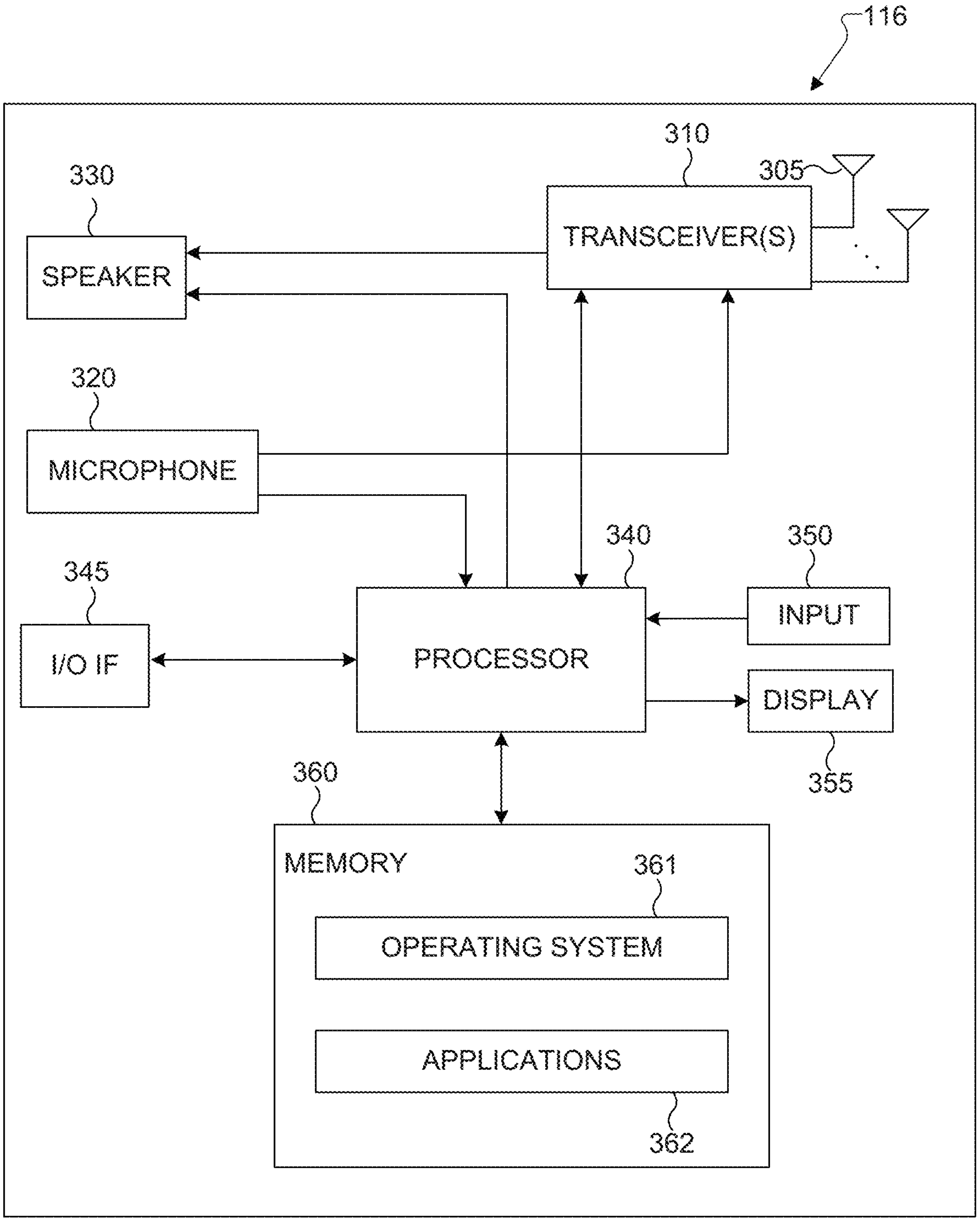

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205$a$-205$n$, multiple transceivers 210$a$-210$n$, a controller/processor 225, a memory 230, and a backhaul or network interface 235.

The transceivers 210$a$-210$n$ receive, from the antennas 205$a$-205$n$, incoming RF signals, such as signals transmitted by UEs in the network 100. The transceivers 210$a$-210$n$ down-convert the incoming RF signals to generate IF or baseband signals. The IF or baseband signals are processed by receive (RX) processing circuitry in the transceivers 210$a$-210$n$ and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
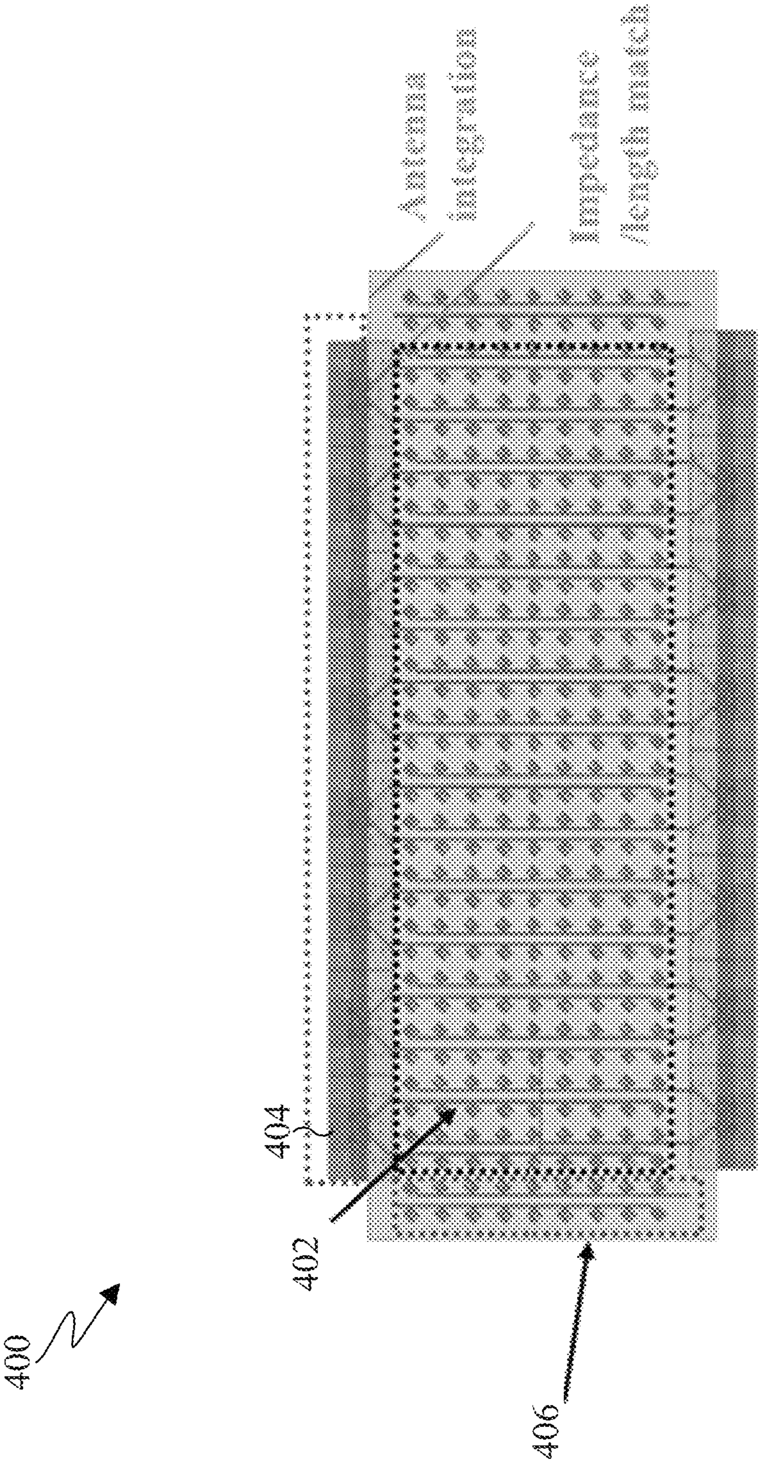
FIG. 4 illustrates an example 32-channel antenna array in accordance with an embodiment of this disclosure.

FIG. 4 illustrates an example antenna panel 400 with a 32-channel antenna array 402 in accordance with an embodiment of this disclosure. The embodiment of the example antenna panel 400 illustrated in FIG. 4 is for illustration only. FIG. 4 does not limit the scope of this disclosure to any particular implementation of an electronic device.

As shown in FIG. 4, to address the aforementioned challenges, THz antenna panel aims at high efficiency, wide gain bandwidth and wide scanning range via a single-layer antenna array. FIG. 1 presents one embodiment consisting of sixteen ports 404 from a first side of the antenna panel 400 and sixteen ports 404 from a second side of the antenna panel 400. The first side is opposite to the second side.

Although FIG. 4 illustrates an antenna panel 400, various changes may be made to FIG. 4. For example, the sizes, shapes, and dimensions of the antenna panel 400 and its individual components can vary as needed or desired. Also, the number and placement of various components of the antenna panel 400 can vary as needed or desired. In addition, the antenna panel 400 may be used in any other suitable wireless communication process and is not limited to the specific processes described above.

By optimizing unequal antenna row spacing of 0.3-0.35 kg/1.35-1.4 kg, a row-to-row shift is 0.9-1.1 kg, and a different unit-cell size with reference width of 0.45-0.55 kg and length of kg for improving at least one of efficiency, wide scanning range, or wide realized gain bandwidth. The result, via the designed array, is high efficiency of 90%, wide scanning range of and 10% realized gain bandwidth.

The commonly-used straight line transition is not applicable for 45-degree polarization, the designed different unit-cell size are designed with reference width of 0.45-0.55 kg and length of 0.3-0.45 kg. This configuration reduces the element-to-element spacing, thus improving the efficiency and bandwidth. The parameters of each antenna elements can be tuned separately for suitable current distribution.

To meet the wide scanning performance, the antenna spacing is designed with a half wavelength at a given frequency. However, there are some challenges of unit-cell size, antenna coupling, and fabrication limitations. With our designed unequal antenna row spacing of 0.3-0.35 kg 1.35-1.4 kg configuration, the antenna spacing is available for a half-wavelength, thus improving the scanning volume and suppressing the grating lobes.

The designed impedance matching network is easily integrated with wire-bonding and flip-chip bonding. Based on the length matching part, antenna panel 400 can be compatible with different radio frequency transceivers (RFIC) by optimizing the length-matching network.

The antenna panel 400 can include dummy antenna rows 406 at opposite ends of the antenna array 402. The dummy antenna rows 406 can be on a third side and a fourth side of the antenna panel 400, where the third side is opposite to the fourth side. In the illustrative embodiment of FIG. 4, two termination dummy rows 406 are used to enhance the radiation efficiency by making full use of mutual coupling of nearby antenna rows.

The antenna panel 400 can operate at 140 GHz operation bands. As antenna dimensions are determined by the wavelength at a given frequency, the antenna panel 400 can also be applied to different frequency bands such as those of in 5G which are lower, or at higher frequencies such as 300 GHz by changing the unit-cell/transition/termination elements.

Antenna elements or row numbers can be modified for different embodiments. For example, three-element short rows can be used to make a simplified 2D scanning antenna array. The row-to-row coupling can be tuned by changing row-to-row shift distance, which has a purpose to slightly tune the frequency response without changing the unit-cell parameters.

Figure 5:
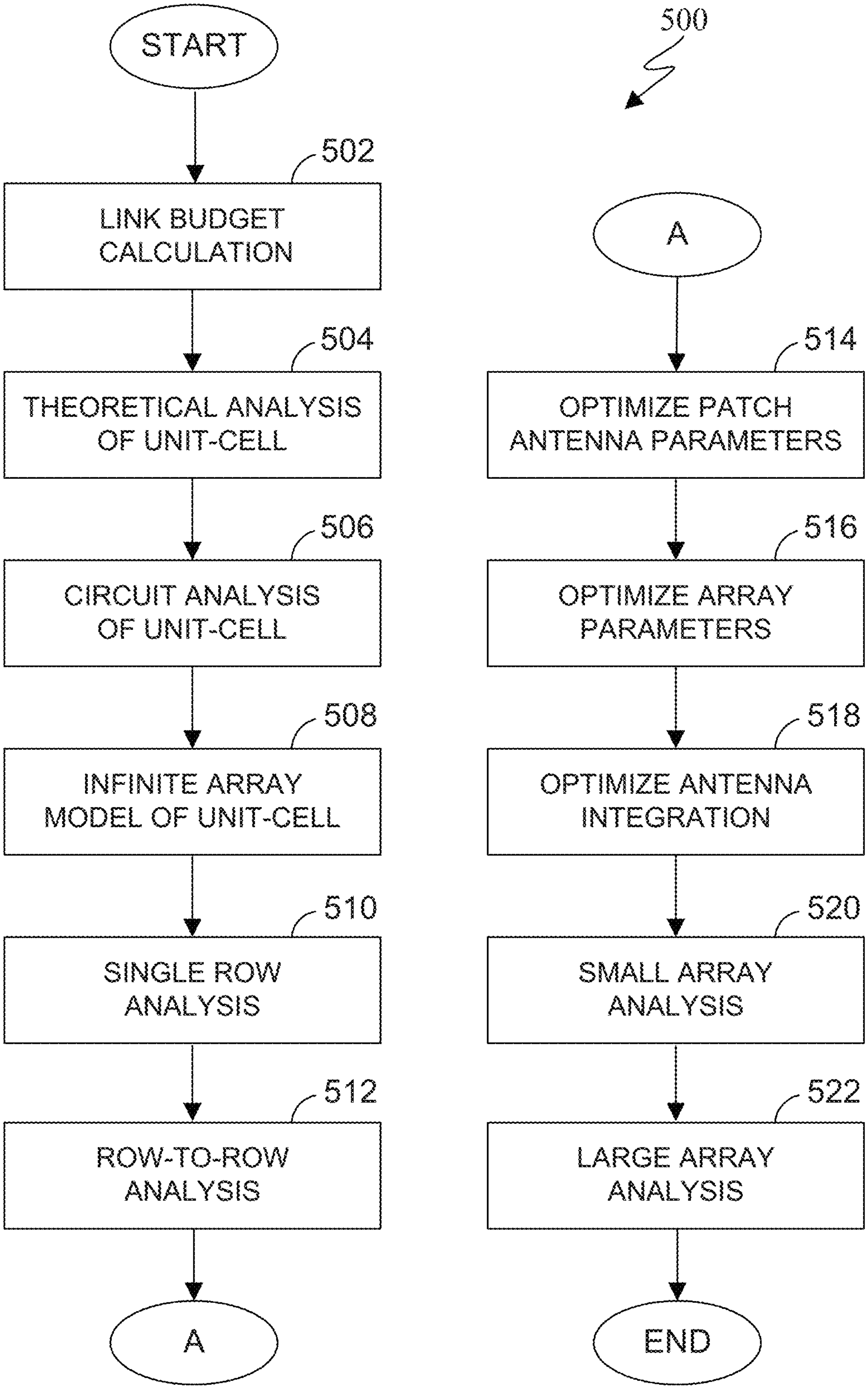
FIG. 5 illustrates an example method for design of a low-profile high-efficiency wide-scanning antenna array in accordance with this disclosure.

FIG. 5 illustrates an example method 500 for example method for design of a low-profile high-efficiency wide-scanning antenna array according to this disclosure.

As shown in FIG. 5, a link budget calculation is performed for the antenna panel 400 at step 502. The link budget is dependent on a distance to target and frequencies and gains of the antennas. The link budget accounts for all of the gains and losses from the transmitter at BS 102 through a transmission medium to the target receiver or UE 104, 111-116.

A theoretical analysis of unit-cells can be performed for the antenna panel 400 at step 504. The theoretical analysis of a unit-cell can be performed to determine different measurements of unit-cells to perform communication in a MIMO antenna. Different measurements can be analyzed for determining optimal dimensions.

A circuit analysis of unit-cells can be performed for the antenna panel 400 at step 506. A representative circuit can be provided for the unit-cell based on the dimensions determined in the theoretical analysis. The circuit analysis can provide experimental results to confirm the results of the theoretical analysis.

An infinite array model of unit-cells can be performed for the antenna panel 400 at step 508. Once dimensions of a unit-cell are confirmed in the circuit analysis, an infinite array model can be generated using the dimensions. The infinite array model can be used to test and determine the results of repeating the unit-cells in greater groups.

After the infinite array model is created, a single row analysis can be performed for the antenna panel 400 in step 510. A single row of unit-cells can be composed for testing. The spacing of the elements can be tested in the single row analysis. In certain embodiments, the single row testing can also test using differently sized unit-cells in the row.

A row-to-row analysis can be performed for the antenna panel 400 in step 512. The row-to-row analysis can test the performance of adjacent rows based on a row spacing and a unit-cell shift between adjacent rows. The row-to-row analysis can also test the arrangement of unit cells facing opposite directions away from the adjacent rows and towards the adjacent rows.

The patch antenna parameters can be optimized for the antenna panel 400 in step 514. The results of the different analysis can be used to determine optimal dimensions for each of the patch antennas on the antenna panel 400. The optimal dimensions can be determined based on a specified frequency, a range of frequencies, etc.

The antenna array parameters can be optimized for the antenna panel 400 in step 516. The results of the different analysis can be used to determine optimal spacing of antenna rows and shift of antenna rows for the antenna panel. The optimal spacing can be determined based on a specified frequency, range of frequencies, etc.

The antenna integration can be optimized for the antenna panel 400 in step 518. The antenna integration can determine an amount of ports to be used for the antenna panel 400. The antenna integration can also include determining impedance matching for the antenna rows.

A small array analysis can be performed for the antenna panel 400 in step 520 and a large array analysis can be performed for the antenna panel 400 in step 522. The large array analysis can be an analysis of a full antenna array in an antenna panel, such as antenna array 402 in antenna panel 400. The small antenna array analysis can be performed for a reduced antenna array of an antenna panel, such as one third of the antenna rows or two thirds of the antenna rows of the antenna array 4002.

Although FIG. 5 illustrates one example of a method 500 for design of a low-profile high-efficiency wide-scanning antenna array, various changes may be made to FIG. 5. For example, while shown as a series of steps, various steps in FIG. 5 may overlap, occur in parallel, or occur any number of times.

FIGS. 6A through 6K illustrate an example low-profile high-efficiency wide-scanning antenna array 600 in accordance with this disclosure. The embodiments of the example low-profile high-efficiency wide-scanning antenna array 600 illustrated in FIGS. 6A through 6K are for illustration only. FIGS. 6A through 6K do not limit the scope of this disclosure to any particular implementation of an electronic device.

Figure 6A:
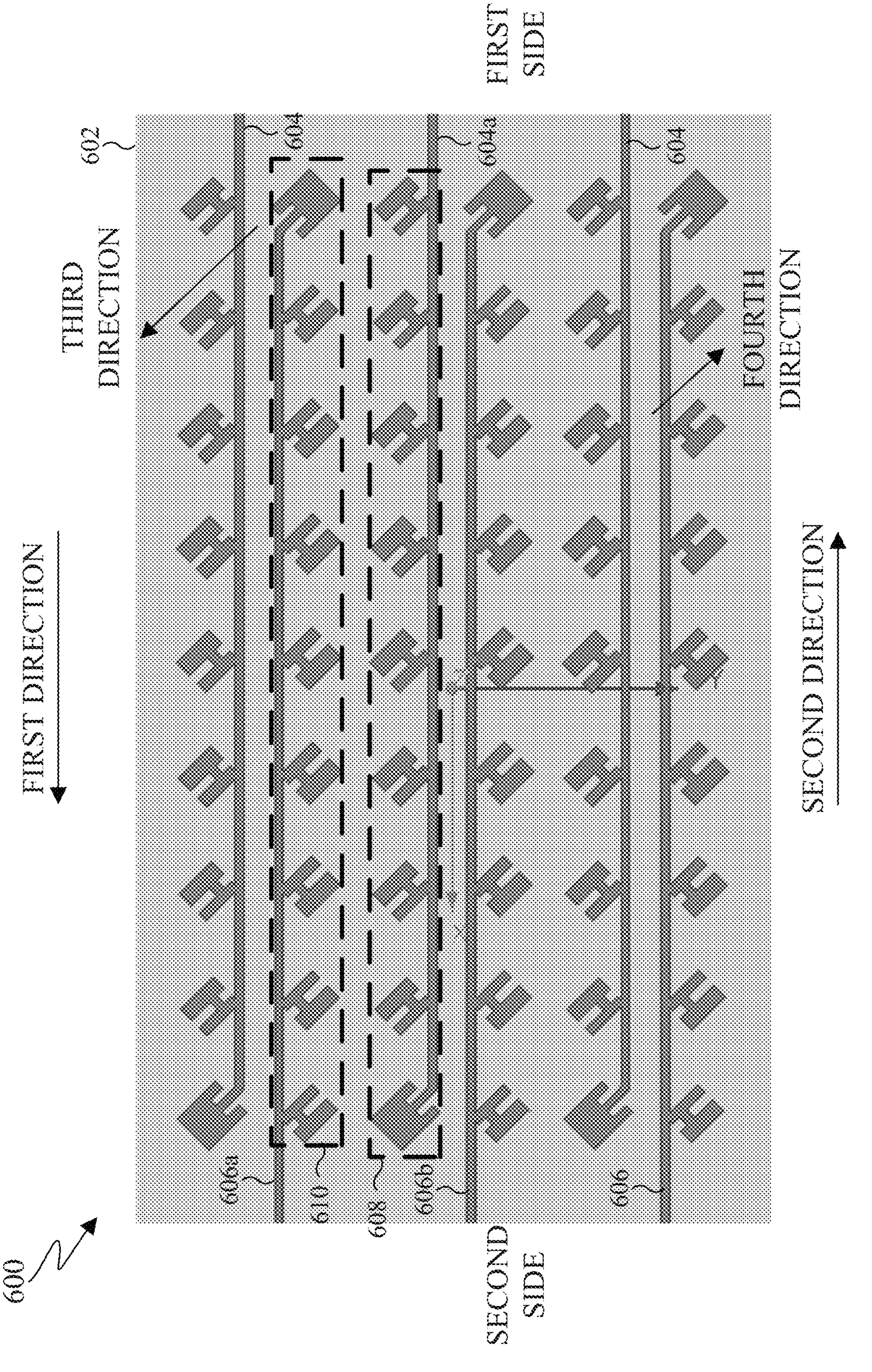
FIGS. 6A-6K illustrate an example low-profile high-efficiency wide-scanning antenna array in accordance with this disclosure.

As shown in FIG. 6A, the antenna array 600 can be used for in an antennal panel, such as antenna panel 400. The antenna array 600 can include a substrate 602, first transmission lines 604, second transmission lines 606, first antenna elements 608, second antenna elements 610.

The transmission lines 604 and 606 can be positioned on the substrate. The first transmission lines 604 can extend from in a first direction from a first side of the substrate 602. The second transmission lines 606 can extend in a second direction from a second side of the substrate 602. The second side of the substrate 602 can be an opposite side from the first side of the substrate 602. The first direction can be opposite to the second direction.

The first antenna elements 608 can be positioned on the substrate and coupled to the first transmission lines 604. The first antenna elements can be coupled to a first of the first transmission lines 604 (a first-first transmission line 604*a*). The first antenna elements can extend in a third direction oriented away from the first-first transmission line 604*a*. The first antenna elements 608 can extend at an angle from the first-first transmission line 604*a*.

The second antenna elements 610 can be positioned on the substrate and coupled to the second transmission lines 606. The second antenna elements can be coupled to a first of the second transmission lines 606 (a first-second transmission line 606*a*). The second antenna elements can extend in a fourth direction away from the first-second transmission line 606*a* and toward the first-first transmission line 604*a*. The fourth direction is opposite to the third direction. The second antenna elements 610 can extend at an angle from the first-second transmission line 606*a*.

At least two first antenna elements 608 coupled to the first-first transmission line 604*a* are differently sized. At least two second antenna elements 610 coupled to the first-second transmission line 606*a* are differently sized. This differently sized antenna element arrangement can be extended for each of the first transmission lines 604 and the second transmission lines 606. The differently sized antenna elements can have a common width and different lengths. The common width is in an inclusive range from 0.45 $\lambda_g$ to 0.55 $\lambda_g$ and the different lengths are within an inclusive range from 0.3 $\lambda_g$ to 0.45 $\lambda_g$.

The first antenna elements 608 can be coupled to first-first transmission line 606*a* at a 45-degree angle to the first direction. The second antenna elements 610 can be coupled to the first-second transmission line 606 at a 45-degree angle to the second direction. The arrangement of the first antenna elements 608 and the second antenna elements 610 can be extended for each of the first transmission lines 604 and the second transmission lines 606.

The first-second transmission line 606*a* is positioned adjacent to the first-first transmission line 604*a* on the substrate. A distance between the first-first transmission line 604*a* and the first-second transmission line 606*a* is different than a distance between the first-first transmission line 604*a* and a second of the second transmission lines 606 (a second-second transmission line 606*b*). The second-second transmission line 606*b* is adjacent to the first-first transmission line 606*a* on an opposite side from the first-second transmission line 604*a*.

A row spacing between the first-first transmission line 604*a* and the second-second transmission line 606*b* is in an inclusive range from 0.3 $\lambda_g$ to 0.35 $\lambda_g$. A row spacing between the first-first transmission line 604*a* and the first-second transmission line 606*a* is in an inclusive range from 1.35 $\lambda_g$ to 1.4 $\lambda_g$. These row spacing can between extended for all of the first transmission lines 604 and the second transmission lines 606 of the antenna array 600.

As shown in FIGS. 6B through 6I, as THz bands poses several challenges in terms of high-frequency circuit components, a single-layer series-fed configuration is proposed to address the small wavelength issues. For instance, the design dimensions are close to the fabrication tolerances such as printed circuit board (PCB) and low temperature co-fired ceramics (LTCC). For antenna specification, a 45-degree slant polarization is employed for the sake of coverage improvement and interference reduction. However, a 45-degree polarized series-fed antenna array is challenging to design. The commonly-used straight-line arrangement is required to be rotated and prolonged to connect the antenna elements, thus producing more insertion loss and limiting the bandwidth.

A field analysis of designed antenna array can be performed. Instead of feeding between edge centers, a designed transition minimizes the element-to-element spacing as one guided wavelength. Specifically, a coupling arm is connected with common feeding line and coupled to each radiating element. For this embodiment, one termination patch 612 is used as termination of a travelling wave. The different phase is set from top and bottom rows. The radiating patch elements 614 can be optimized separately, which is used for side-lobe and cross-polarization control. The radiating elements 614 can be located on one side of feeding line, thus the feeding line spacing is of critical importance to adjust antenna spacing as a half-wavelength. With an unequal antenna row spacing of 0.3-0.35 $\lambda g$/1.35-1.4 $\lambda g$ configuration, the antenna spacing is available for a half-wavelength, thus improving the scanning volume and suppressing the grating lobes.

Figure 6C:
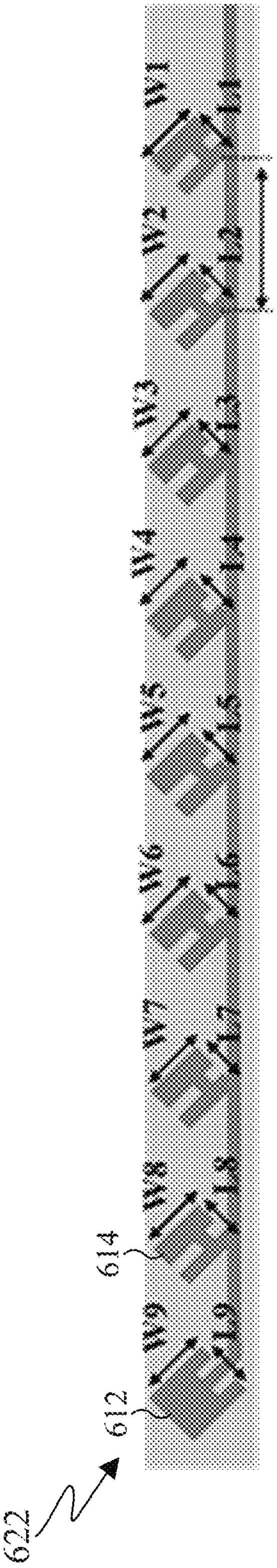
Figure 6E:
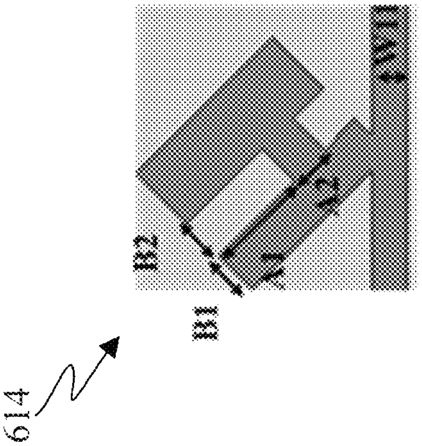
Figure 6D:
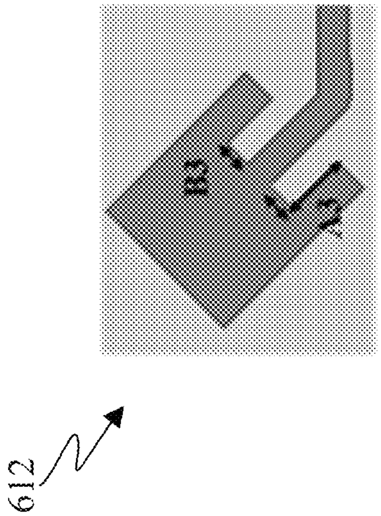
Figure 6B:
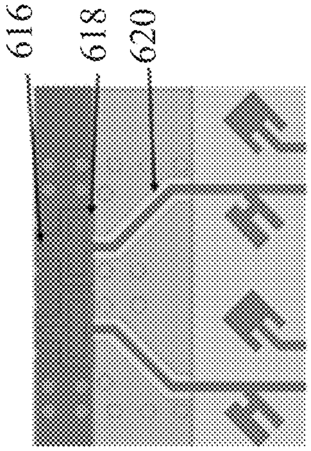
Figure 6F:
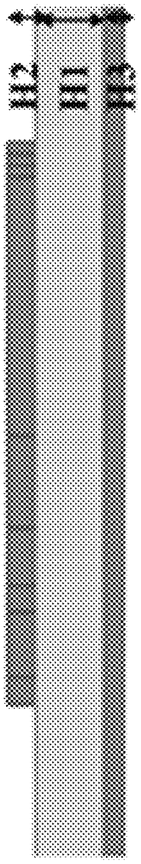

FIG. 6B shows an integration part 616, impedance matching network 616, and length matching network 620. As antenna array 600 can be fabricated via a standard PCB technique, the co-planar waveguide (CPW) is used to integrate with bonding wire and flip chip bonding balls. The matching network 620 is utilized for impedance and length matching between RFIC and antennas.

FIGS. 6C-6E show optimized parameters of a single row 622 for antenna array 600 (single row), which can be optimized for different frequency bands. Table 1 shows the optimized value for important antenna parameters with the respect of guided wavelength. The designed antenna array can be fabricated with a single-layer standard PCB technique, i.e., the patch antennas are fabricated on top of the dielectric substrate.

TABLE 1

Antenna parameters with optimized range with the ratio of guided wavelength

| Parameter | W1-W9 | L1&L8 | L2&L7 | L3&L6 | L4&L5 | L9 | S1 | W11 |
|---|---|---|---|---|---|---|---|---|
| Range of values | 0.45-0.55$\lambda_g$ | 0.3-0.35$\lambda_g$ | 0.32-0.37$\lambda_g$ | 0.35-0.39$\lambda_g$ | 0.4-0.45$\lambda_g$ | 0.4-0.45$\lambda_g$ | 0.95-1.05$\lambda_g$ | 0.06-0.09$\lambda_g$ |
| Parameter | A1 | A2 | A3 | B1-B3 | H1 | H2 | H3 | |
| Range of values | 0.2-0.25$\lambda_g$ | 0.06-0.09$\lambda_g$ | 0.1-0.15$\lambda_g$ | 0.06-0.09$\lambda_g$ | 0.06-0.09$\lambda_g$ | 0.02-0.03$\lambda_g$ | 0.02-0.03$\lambda_g$ | |

Based on flow chart (shown in FIG. 5), theoretical analysis in step 504 can be used to analyze antenna array specifications. Theoretical values can be used as a starting point. Next, numerical methods are used to optimize the parameters, and Ansys HFSS simulator is used in this work. Further, we optimize row-to-row coupling, impedance matching between antenna and RFIC.

Figure 6G:
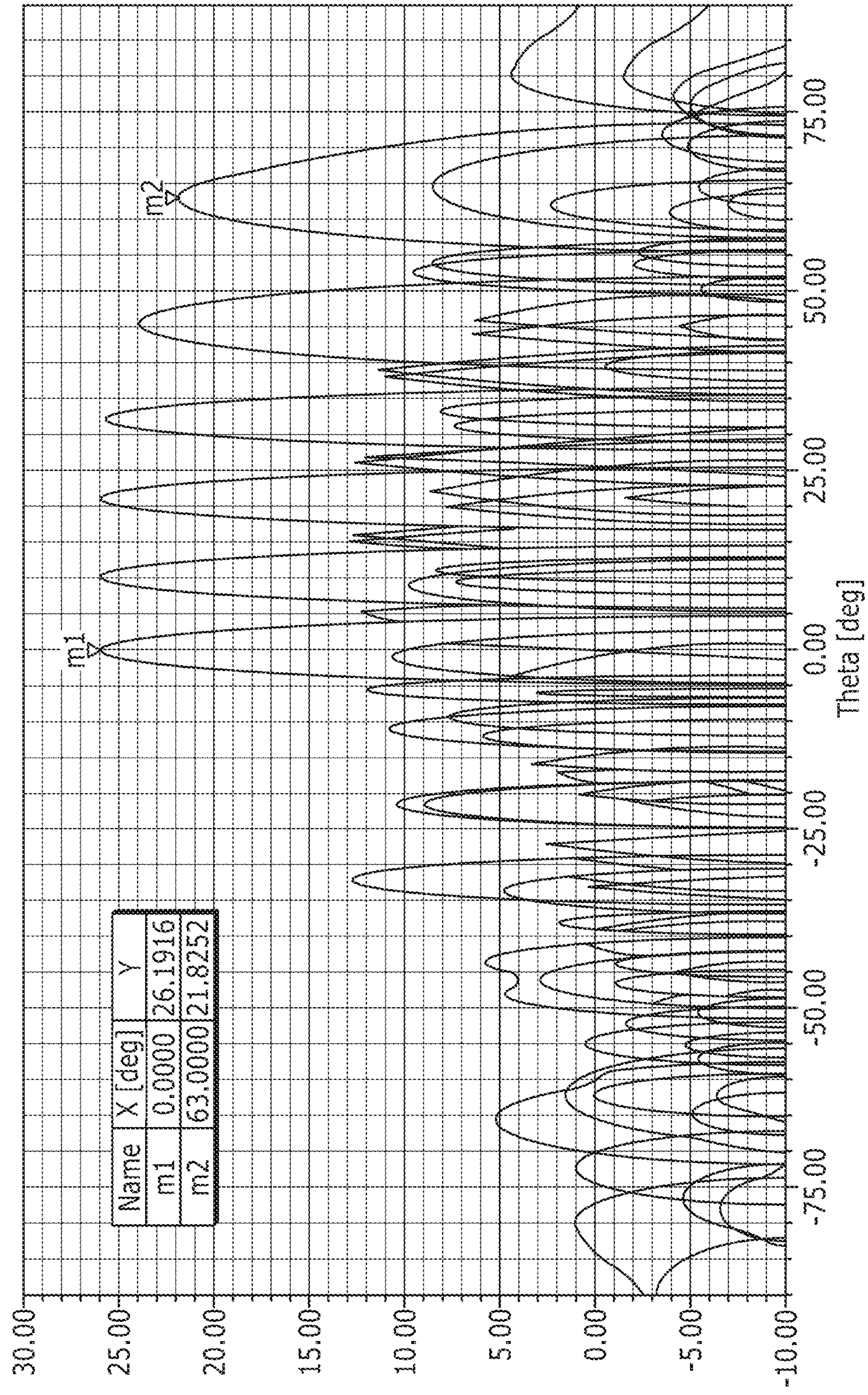

A first verification is scanning capability. The designed antenna element spacing is 0.5 $\lambda_0$. FIG. 6G shows simulated realized gains 622 with different scanning angles. As the scanning angle increases, the gain decreases as the antenna aperture is multiplied with cosh. The realized gain is observed at 21.8 dBi at 63° without grating lobe issues. Therefore, antenna array 600 can maintain wide scanning range by optimizing the antenna spacing.

Figure 6H:
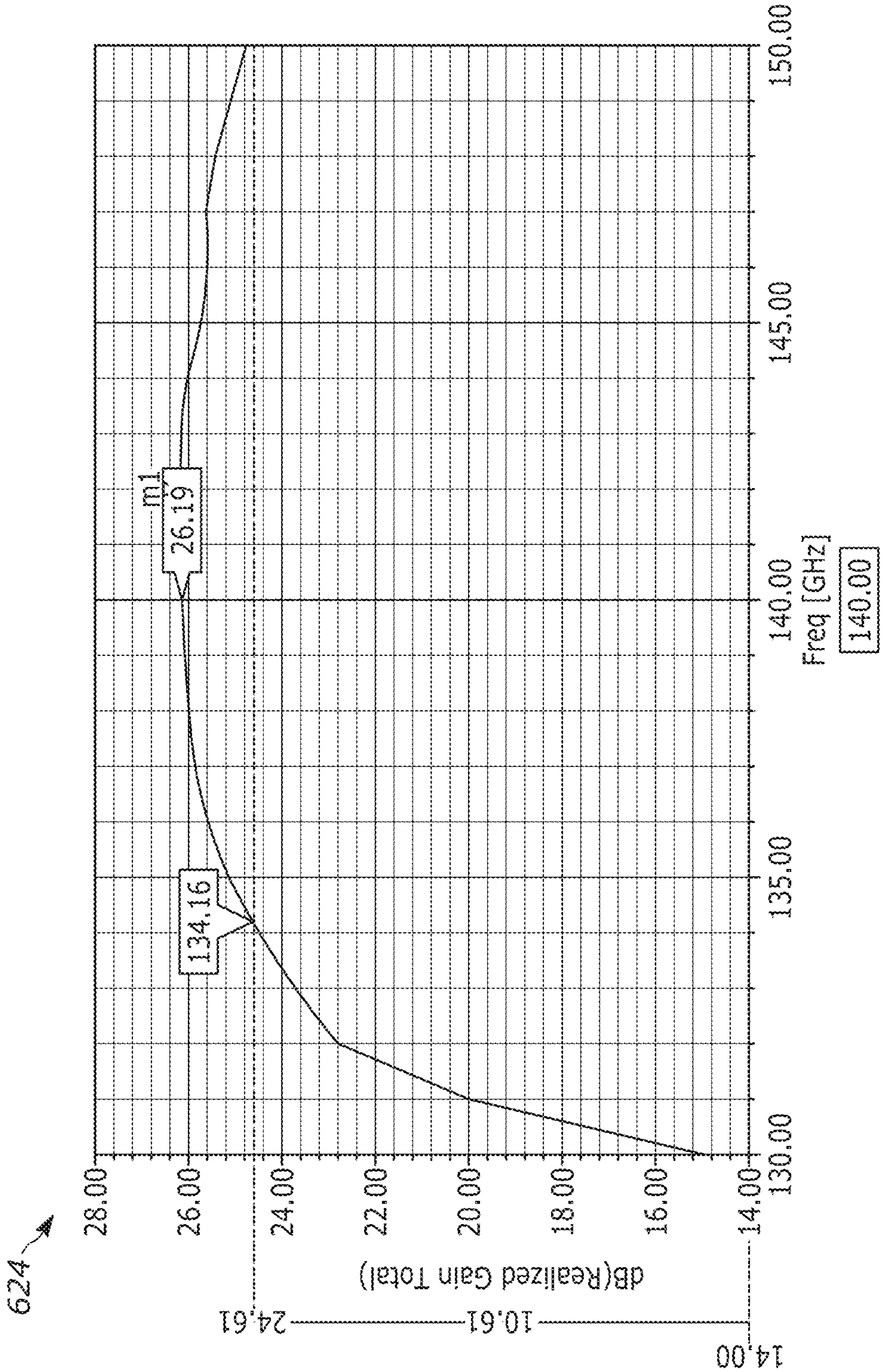
Figure 6I:
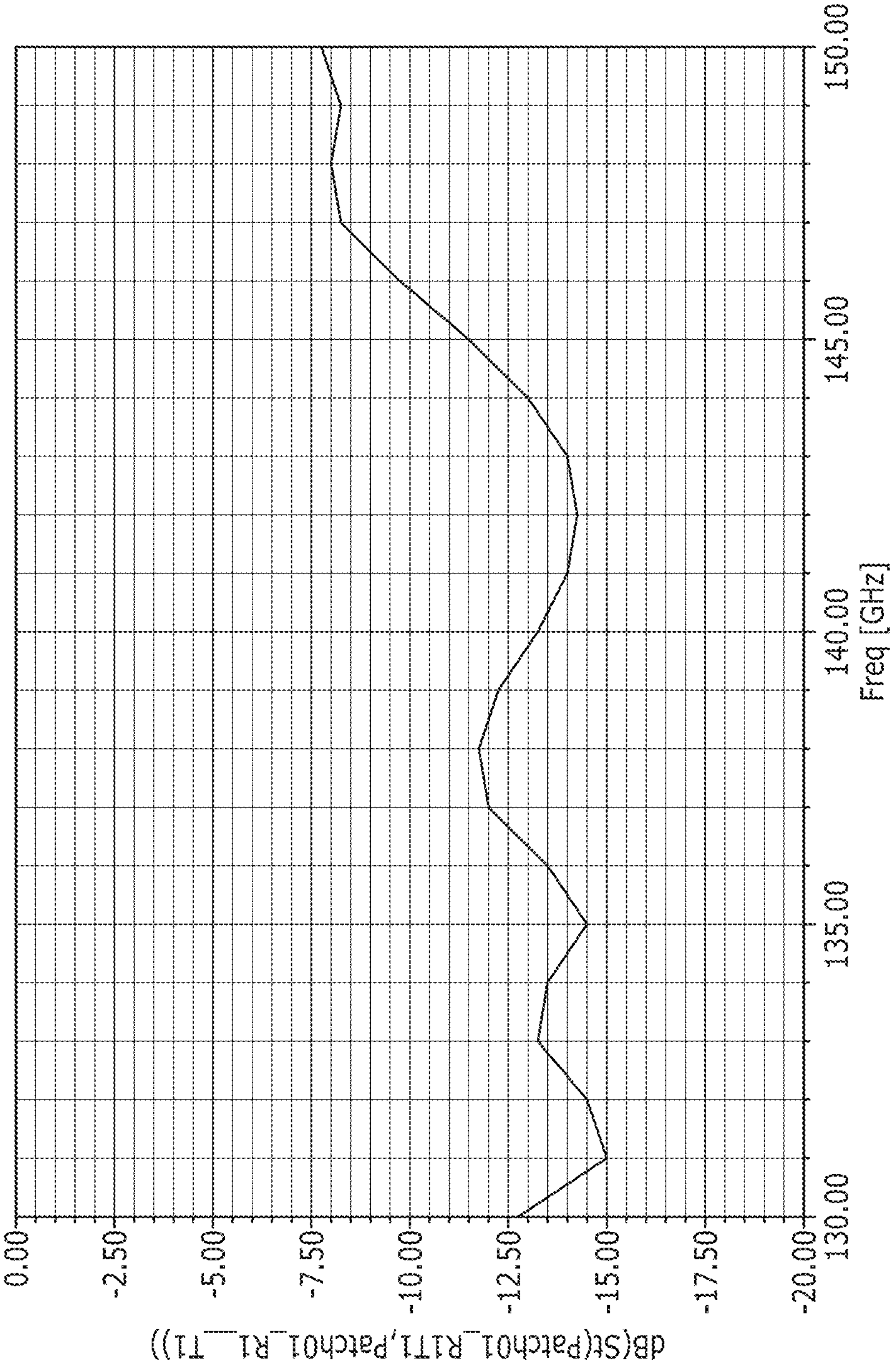
Figure 6J:
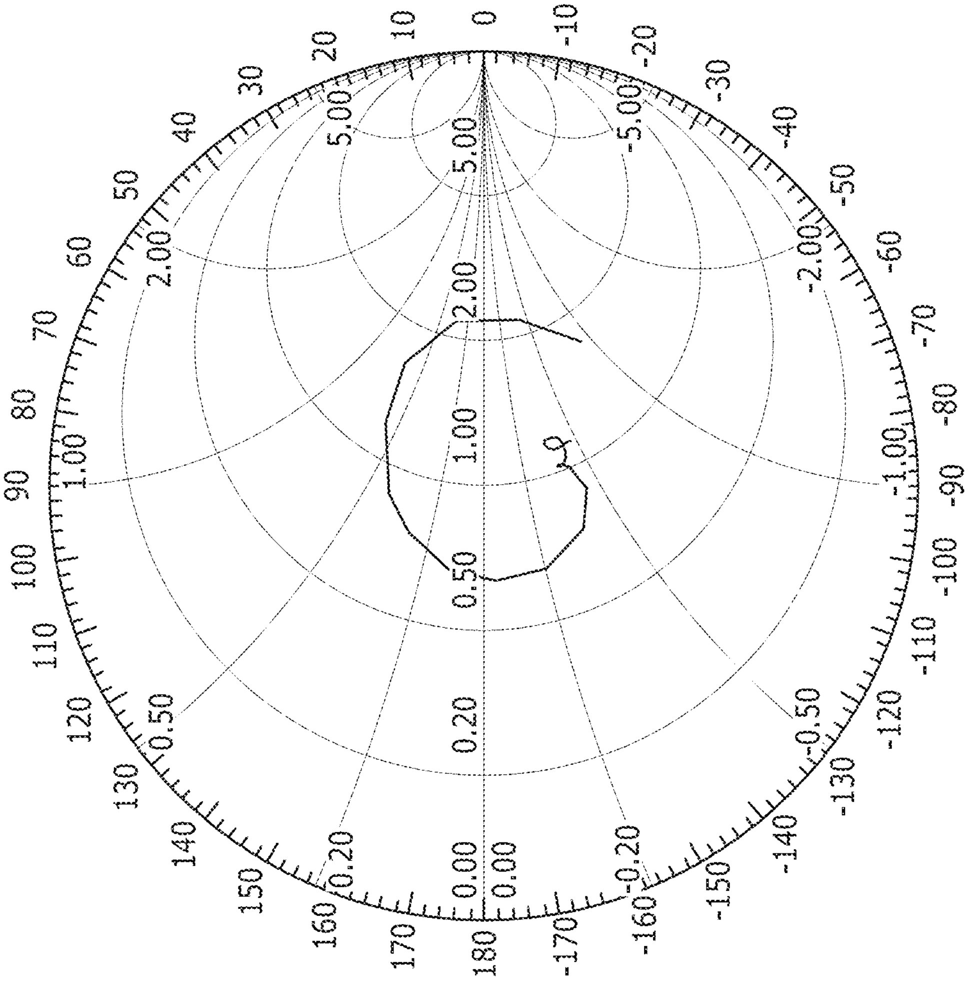
Figure 6K:
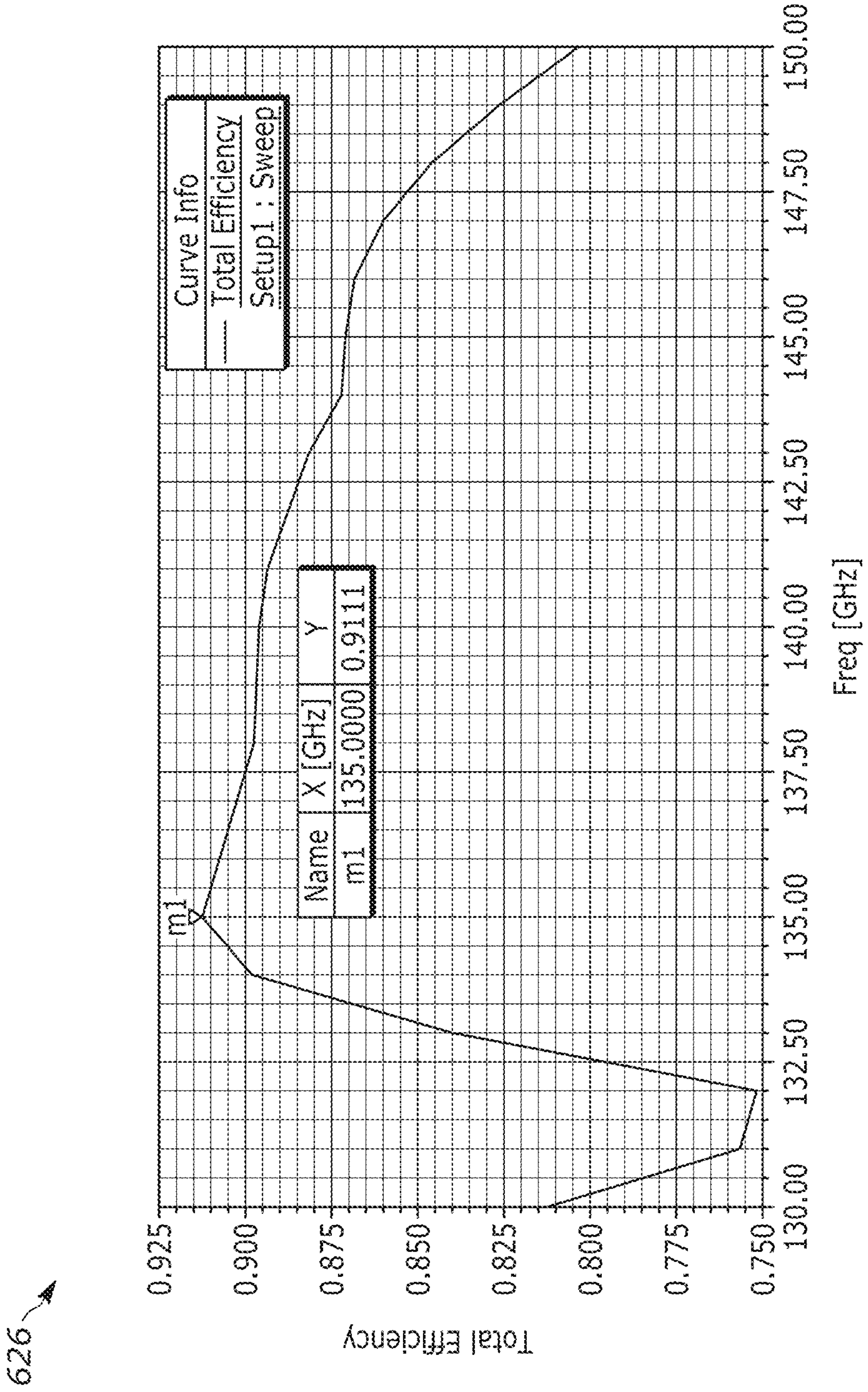

A second verification is high efficiency. FIG. 6H presents that the 3-dB realized gain bandwidth 624 is 10% (14 GHz), showing that antenna array 600 can perform at a high gain with a wide frequency bandwidth. FIGS. 6I and 6J shows that the −10-dB impedance matching bandwidth is 14% (20 GHz). FIG. 6K presents the efficiency 626 of antenna array 600, which illustrates that a peak efficiency is 91%.

Although FIGS. 6A through 6K an example low-profile high-efficiency wide-scanning antenna array 600, various changes may be made to FIGS. 6A through 6K. For example, the sizes, shapes, and dimensions of the low-profile high-efficiency wide-scanning antenna array 600 and their individual components can vary as needed or desired. In addition, the low-profile high-efficiency wide-scanning antenna array 600 may be used in any other suitable wireless communication process and is not limited to the specific processes described above.

Figure 7A:
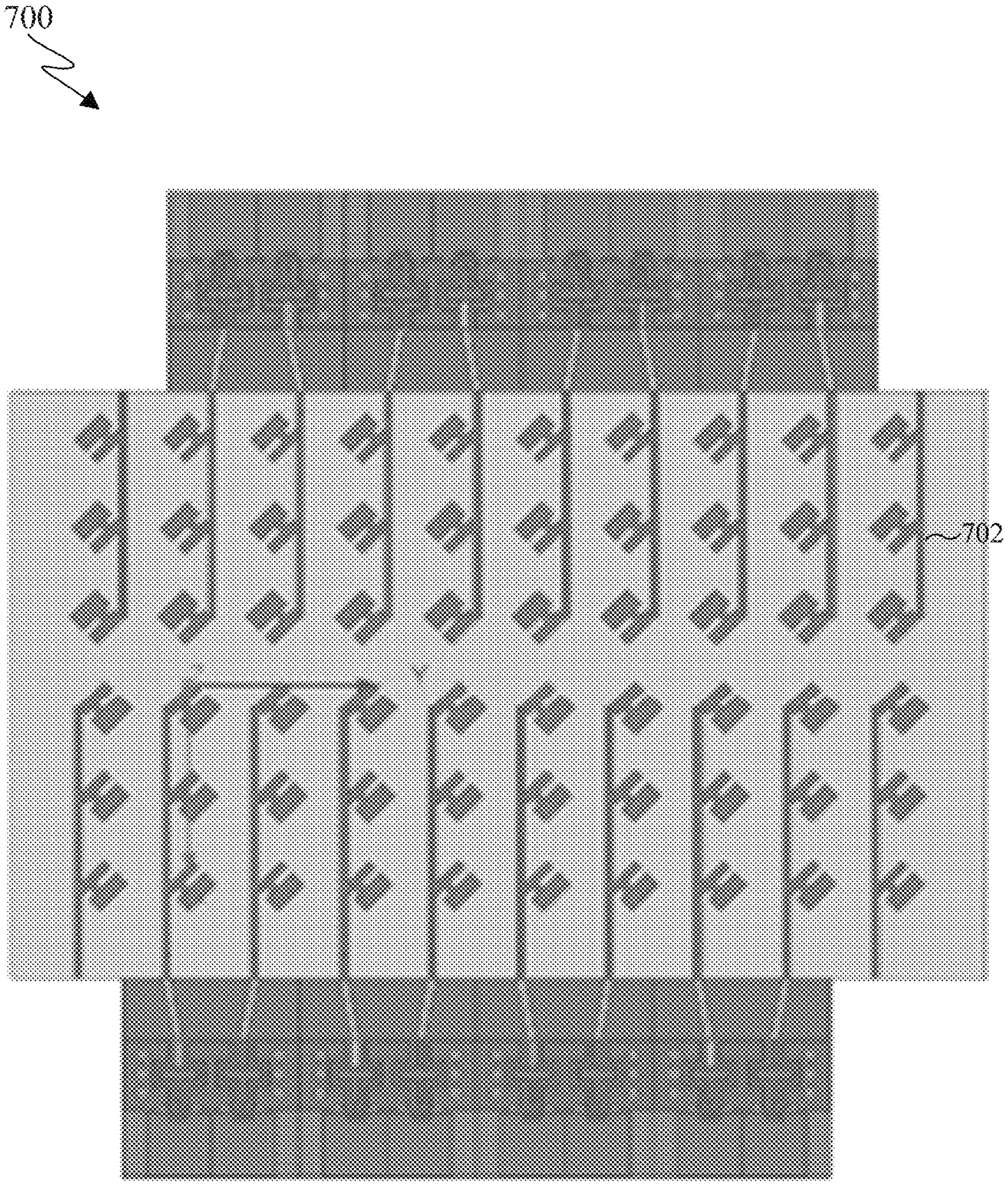
FIGS. 7A-9 illustrate example modifications for a low-profile high-efficiency wide-scanning antenna array in accordance with this disclosure.
Figure 7B:
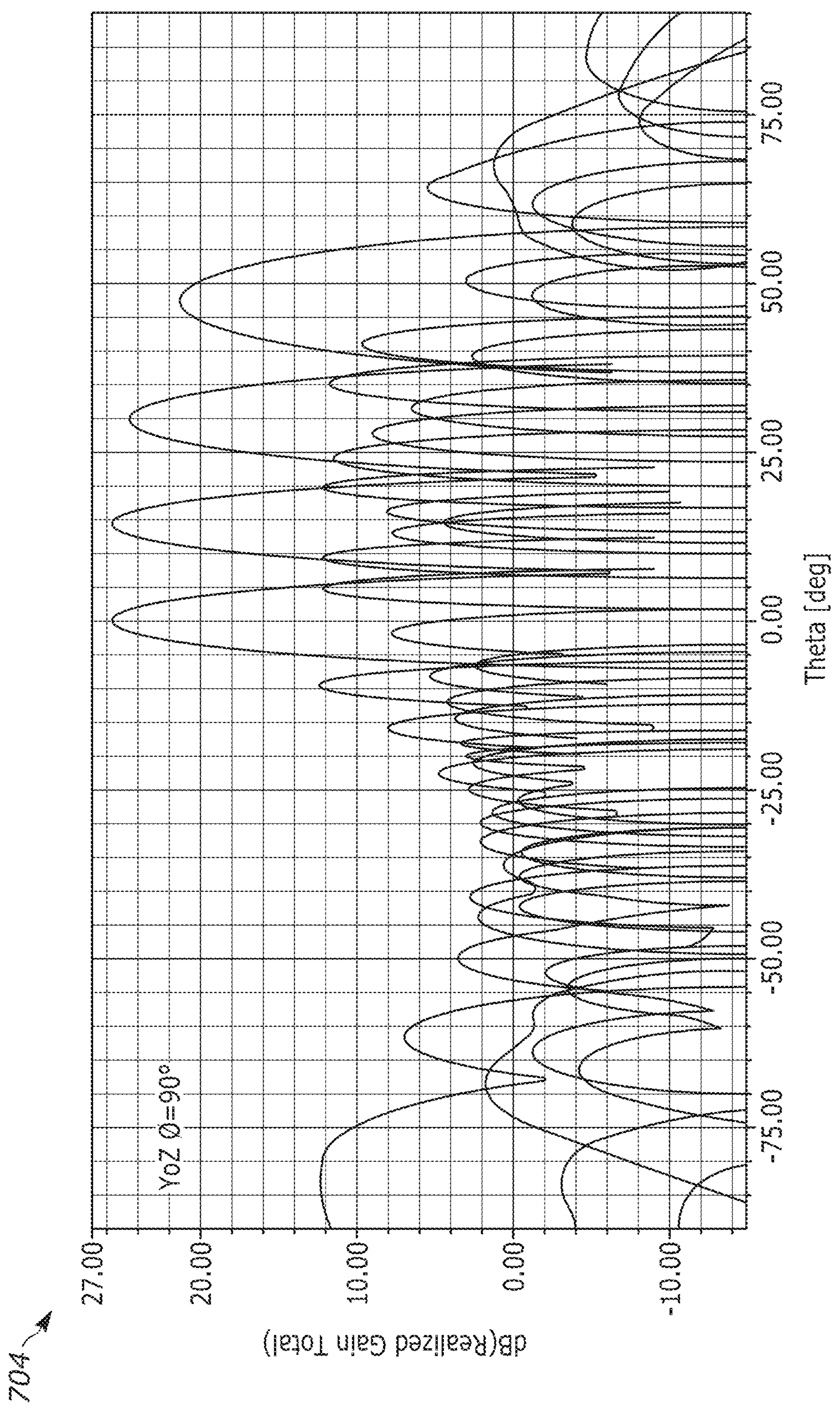
Figure 7C:
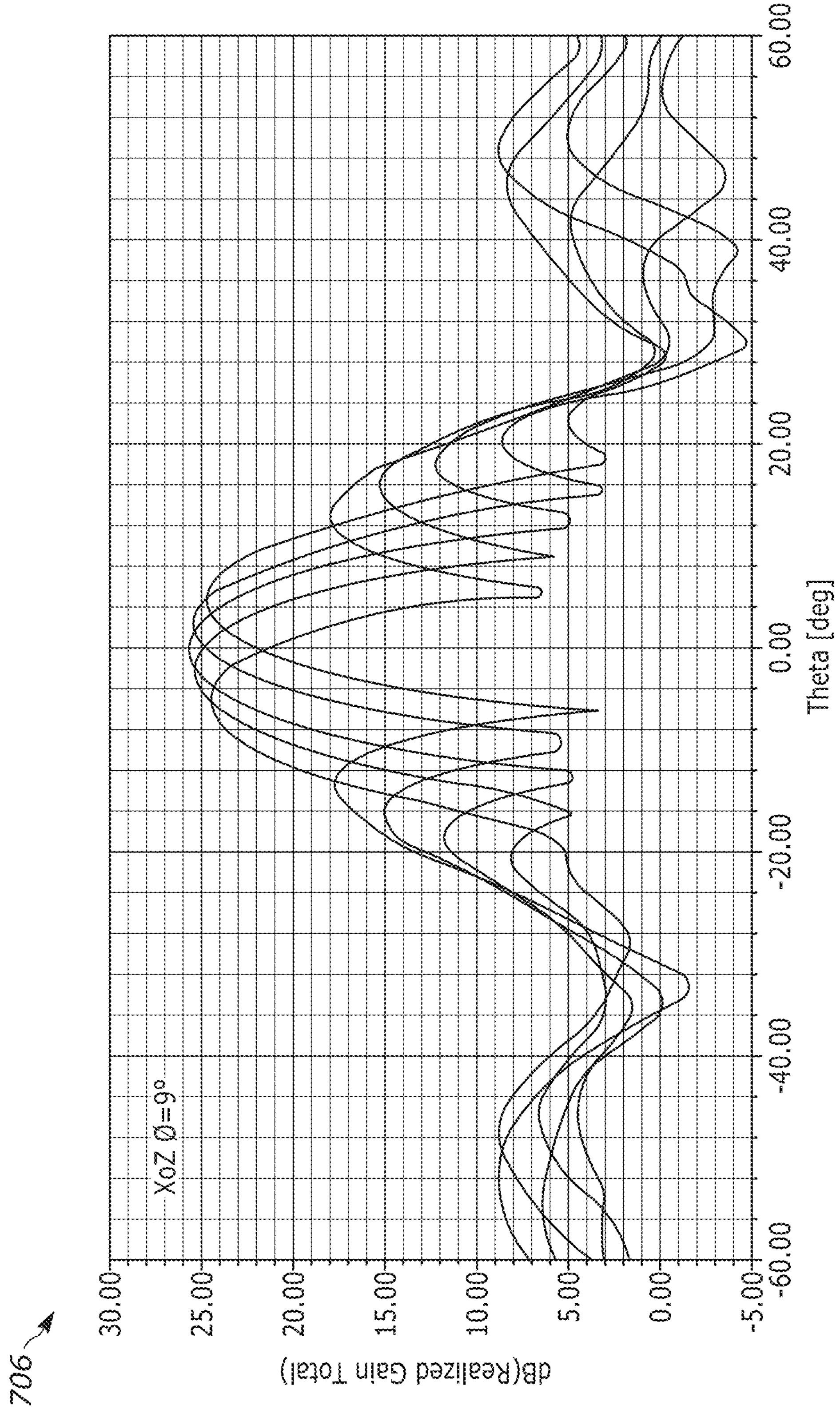
Figure 8:
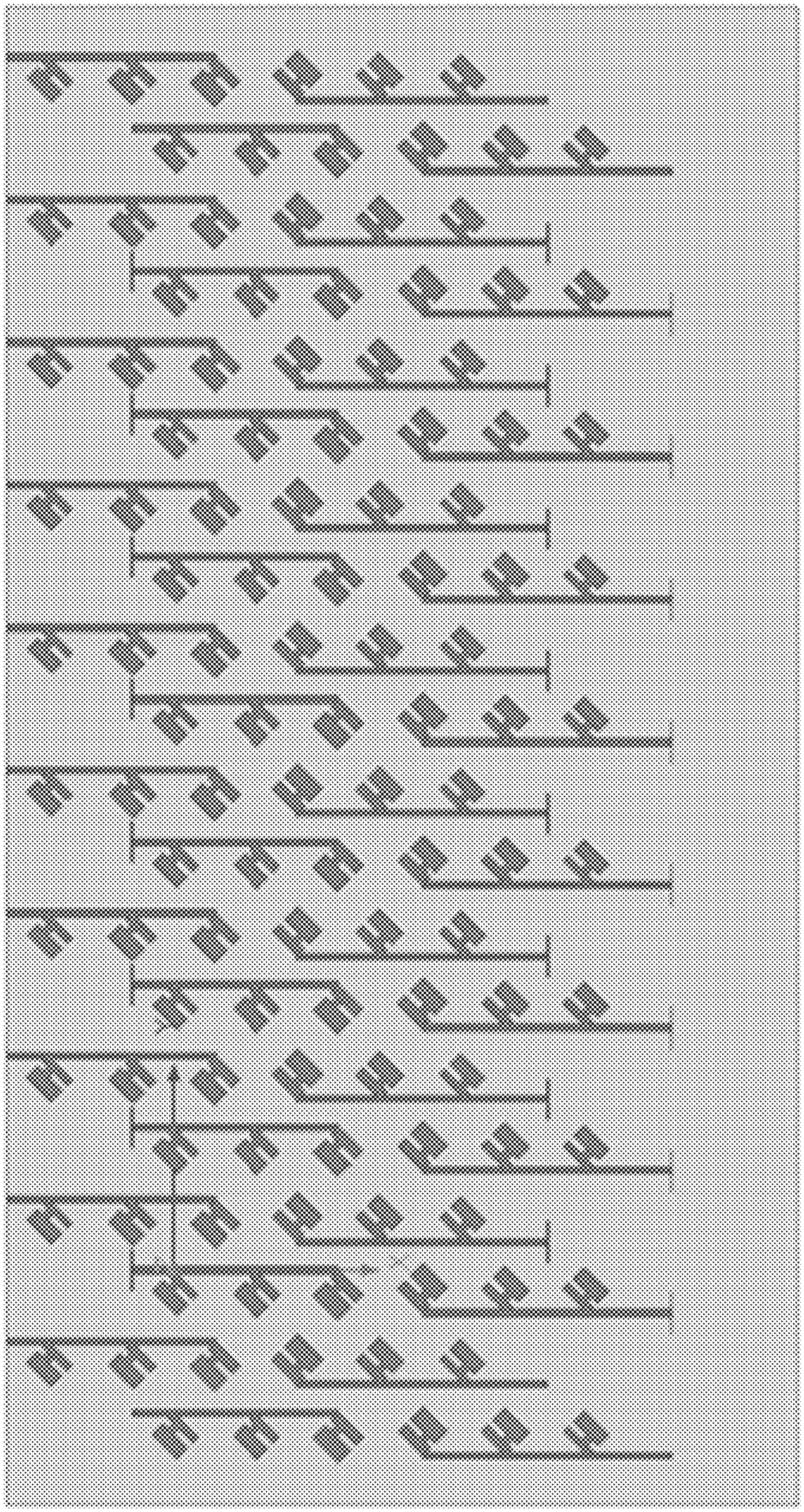
Figure 9:
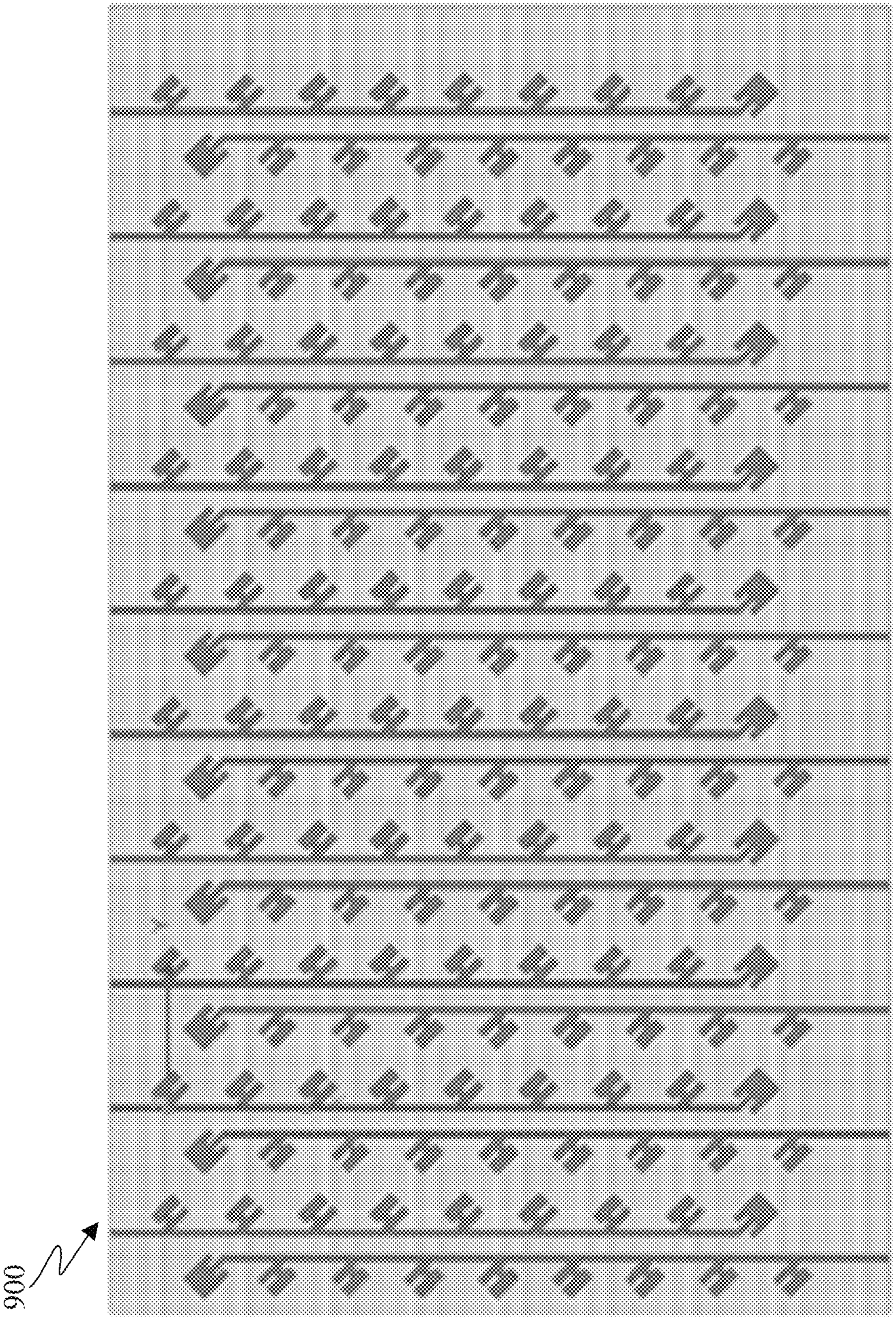

FIGS. 7A through 9 illustrate example modifications for a low-profile high-efficiency wide-scanning antenna array in accordance with this disclosure. In particular, FIGS. 7A-7C illustrates modified antenna array 700 with three element rows 702, FIG. 8 illustrates modified antenna array 800, and FIG. 9 illustrates modified antenna array 900. The embodiments of the modified antenna arrays 700-900 illustrated in FIGS. 7A through 9 are for illustration only. FIGS. 7A through 9 do not limit the scope of this disclosure to any particular implementation of an electronic device.

As shown in FIGS. 7A through 7C, antenna element or row number can be modified for different embodiments. For instance, an embodiment of three-element short rows 702 that makes a simplified 2D scanning antenna array 700. FIGS. 7B and 7C presents scanning results 704 and 706 of 2D planes. Instead of a complex 2D-scanning phased array, antenna array 700 can feed two rows within a same line, thus a phase change is produced along an elevation plane. Though the scanning range of elevation plane is smaller than azimuth plane, it is available for some applications with different beam steering requirements of two planes.

As shown in FIG. 8, antenna array 800 can operate at 140 GHz operation bands. As antenna dimensions are determined by the wavelength at a given frequency, antenna array 800 can be also applied to different frequencies such as a lower frequency such as 5G band, or a higher frequency of 300 GHz band by changing the unit-cell, transition, and termination elements. Also, the row-to-row coupling is tuned by changing row-to-row shift distance, with a purpose to slightly tune the frequency response without changing the unit-cell parameters. FIG. 9 shows an array 900 by changing the shift distance between antenna rows.

Although FIGS. 7A through 9 illustrate example modifications for a low-profile high-efficiency wide-scanning antenna array, various changes may be made to FIGS. 7A through 9. For example, the number and placement of various components of the antenna array 700, antenna array 800, and antenna array 900 can vary as needed or desired. In addition, antenna array 700, antenna array 800, and antenna array 900 may be used in any other suitable wireless communication process and is not limited to the specific processes described above.

Figure 10:
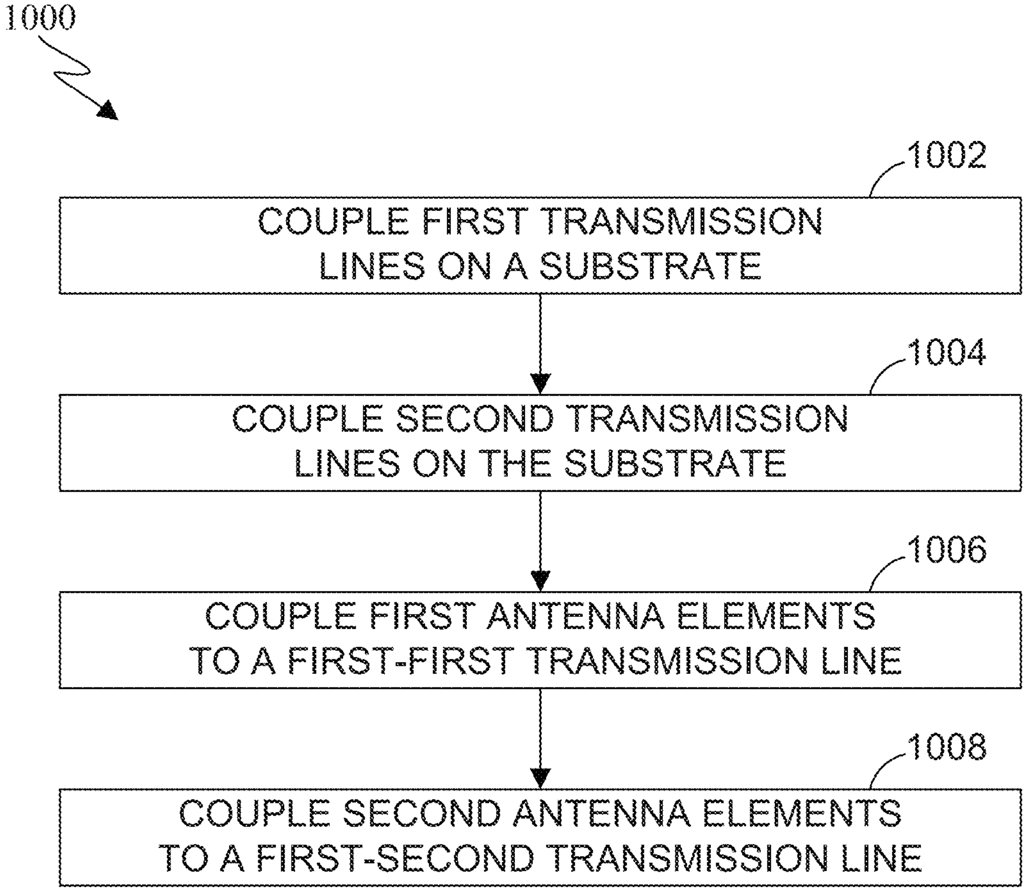
FIG. 10 illustrates an example method for a low-profile high-efficiency wide-scanning antenna array according to this disclosure.

FIG. 10 illustrates an example method 1000 for a low-profile high-efficiency wide-scanning antenna array according to this disclosure.

As shown in FIG. 10, first transmission lines are coupled on a substrate at step 1002. The first transmission lines extending in a first direction from a first side of the substrate.

Second transmission lines are coupled on the substrate at step 1004. The second transmission lines are alternated with the first transmission lines. The second transmission lines extend in a second direction, opposite from the first direction, from a second side of the substrate that is opposite from the first side.

First antenna elements are coupled on the substrate at step 1006. The first antenna elements coupled to a first of the first transmission lines (a first-first transmission line). The first antenna elements extend in a third direction away from the first-first transmission line. At least two antenna elements in the first antenna elements are differently sized.

Second antenna elements are coupled to a first of the second transmission lines (a first-second transmission line), at step 1008. the second antenna elements extending in a fourth direction away from the first-second transmission line and toward the first-first transmission line, the fourth direction opposite to the third direction, the first-first transmission line and the first-second transmission line positioned adjacently on the substrate.

a first distance between the adjacent first-first and first-second transmission lines is different than a second distance between the first-first transmission line and a second of the second transmission lines (a second-second transmission line), the second-second transmission line being adjacent to the first-first transmission line on an opposite side from the first-second transmission line.

Although FIG. 10 illustrates one example of a method 1000 for a low-profile high-efficiency wide-scanning antenna array, various changes may be made to FIG. 10. For example, while shown as a series of steps, various steps in FIG. 10 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
- a substrate;
- first transmission lines on the substrate, the first transmission lines extending in a first direction from a first side of the substrate;
- second transmission lines on the substrate, the second transmission lines alternated with the first transmission lines, the second transmission lines extending in a second direction, opposite from the first direction, from a second side of the substrate that is opposite from the first side;
- first antenna elements on the substrate, the first antenna elements coupled to a first of the first transmission lines (a first-first transmission line), the first antenna elements extending in a third direction away from the first-first transmission line; and
- second antenna elements on the substrate, the second antenna elements coupled to a first of the second transmission lines (a first-second transmission line), the second antenna elements extending in a fourth direction away from the first-second transmission line and toward the first-first transmission line, the fourth direction opposite to the third direction, the first-first transmission line and the first-second transmission line positioned adjacently on the substrate,
- wherein a first distance between the adjacent first-first and first-second transmission lines is different than a second distance between the first-first transmission line and a second of the second transmission lines (a second-second transmission line), the second-second transmission line adjacent to the first-first transmission line on an opposite side from the first-second transmission line, and
- wherein at least two antenna elements in the first antenna elements are differently sized.

2. The apparatus of claim 1, wherein:
- a row spacing between the first-first transmission line and the second-second transmission line is in an inclusive range from 0.3 $\lambda_g$ to 0.35 $\lambda_g$, and
- a row spacing between the first-first transmission line and the first-second transmission line is in an inclusive range from 1.35 $\lambda_g$ to 1.4 $\lambda_g$.

3. The apparatus of claim 2, wherein the differently-sized antenna elements in the first antenna elements have a common width and different lengths.

4. The apparatus of claim 3, wherein the common width is in an inclusive range from $\lambda_g$ to 0.55 $\lambda_g$ and the different lengths are within an inclusive range from 0.3 $\lambda_g$ to 0.45 $\lambda_g$.

5. The apparatus of claim 1, wherein a row-to-row shift between the first antenna elements is in an inclusive range from 0.9 $\lambda_g$ to 1.1 $\lambda_g$.

6. The apparatus of claim 1, wherein:
- the first antenna elements are coupled to first-first transmission line at a 45-degree angle to the first direction, and
- the second antenna elements are coupled to the first-second transmission line at a 45-degree angle to the second direction.

7. The apparatus of claim 6, wherein the first-first transmission line and the first-second transmission line are offset on the substrate to not overlap in a fifth direction that is perpendicular to first direction.

8. An electronic device comprising:
- an antenna comprising:
  - a substrate;
  - first transmission lines on the substrate, the first transmission lines extending in a first direction from a first side of the substrate;
  - second transmission lines on the substrate, the second transmission lines alternated with the first transmission lines, the second transmission lines extending in a second direction, opposite from the first direction, from a second side of the substrate that is opposite from the first side;
  - first antenna elements on the substrate, the first antenna elements coupled to a first of the first transmission lines (a first-first transmission line), the first antenna elements extending in a third direction away from the first-first transmission line; and
  - second antenna elements on the substrate, the second antenna elements coupled to a first of the second transmission lines (a first-second transmission line), the second antenna elements extending in a fourth direction away from the first-second transmission line and toward the first-first transmission line, the fourth direction opposite to the third direction, the first-first transmission line and the first-second transmission line positioned adjacently on the substrate; and
- processing circuitry coupled to the first and second transmission lines, the processing circuitry configured to supply power to control the first and second antenna elements,
- wherein a first distance between the adjacent first-first and first-second transmission lines is different than a second distance between the first-first transmission line and a second of the second transmission lines (a second-second transmission line), the second-second transmission line adjacent to the first-first transmission line on an opposite side from the first-second transmission line, and
- wherein at least two antenna elements in the first antenna elements are differently sized.

9. The electronic device of claim 8, wherein:
- a row spacing between the first-first transmission line and the second-second transmission line is in an inclusive range from 0.3$\lambda_g$ to 0.35 $\lambda_g$, and a row spacing between the first-first transmission line and the first-second transmission line is in an inclusive range from 1.35 $\lambda_g$ to 1.4 $\lambda_g$.

10. The electronic device of claim 9, wherein the differently-sized antenna elements in the first antenna elements have a common width and different lengths.

11. The electronic device of claim 10, wherein the common width is in an inclusive range from 0.45$\lambda_g$ to 0.55 $\lambda_g$ and the different lengths are within an inclusive range from 0.3 $\lambda_g$ to k g.

12. The electronic device of claim 8, wherein a row-to-row shift between the first antenna elements is in an inclusive range from 0.9 $\lambda_g$ to 1.1 $\lambda_g$.

13. The electronic device of claim 8, wherein:

the first antenna elements are coupled to first-first transmission line at a 45-degree angle to the first direction, and the second antenna elements are coupled to the first-second transmission line at a 45-degree angle to the second direction.

14. The electronic device of claim 13, wherein the first-first transmission line and the first-second transmission line are offset on the substrate to not overlap in a fifth direction that is perpendicular to first direction.

15. A method comprising:

coupling first transmission lines on a substrate, the first transmission lines extending in a first direction from a first side of the substrate;

coupling second transmission lines on the substrate, the second transmission lines alternated with the first transmission lines, the second transmission lines extending in a second direction, opposite from the first direction, from a second side of the substrate that is opposite from the first side;

coupling first antenna elements on the substrate, the first antenna elements coupled to a first of the first transmission lines (a first-first transmission line), the first antenna elements extending in a third direction away from the first-first transmission line; and coupling second antenna elements to a first of the second transmission lines (a first-second transmission line), the second antenna elements extending in a fourth direction away from the first-second transmission line and toward the first-first transmission line, the fourth direction opposite to the third direction, the first-first transmission line and the first-second transmission line positioned adjacently on the substrate, wherein a first distance between the adjacent first-first and first-second transmission lines is different than a second distance between the first-first transmission line and a second of the second transmission lines (a second-second transmission line), the second-second transmission line being adjacent to the first-first transmission line on an opposite side from the first-second transmission line, and wherein at least two antenna elements in the first antenna elements are differently sized.

16. The method of claim 15, wherein:

a row spacing between the first-first transmission line and the second-second transmission line is in an inclusive range from 0.3$\lambda_g$ to 0.35 $\lambda_g$, and a row spacing between the first-first transmission line and the first-second transmission line is in an inclusive range from 1.35 $\lambda_g$ to 1.4 $\lambda_g$.

17. The method of claim 16, wherein the differently-sized antenna elements in the first antenna elements have a common width and different lengths.

18. The method of claim 17, wherein the common width is in an inclusive range from 0.45 $\lambda_g$ to 0.55 $\lambda_g$ and the different lengths are within an inclusive range from 0.3 $\lambda_g$ to 0.45 $\lambda_g$.

19. The method of claim 15, wherein a row-to-row shift between the first antenna elements is in an inclusive range from 0.9 $\lambda_g$ to 1.1 $\lambda_g$.

20. The method of claim 15, wherein:

the first antenna elements are coupled to first-first transmission line at a 45-degree angle to the first direction, the second antenna elements are coupled to the first-second transmission line at a 45-degree angle to the second direction, and the first-first transmission line and the first-second transmission line are offset on the substrate to not overlap in a fifth direction that is perpendicular to first direction.

* * * * *